United States Patent [19]
Sprayberry

[11] Patent Number: 5,799,408
[45] Date of Patent: Sep. 1, 1998

[54] STRUCTURAL MEMBER ALIGNMENT TOOL AND METHOD OF USING SAME

[76] Inventor: Michael C. Sprayberry, 3311 Pevehouse Rd., Van Buren, Ark. 72956

[21] Appl. No.: 745,887

[22] Filed: Nov. 8, 1996

[51] Int. Cl.⁶ .............................. G01B 5/25; B23P 19/04
[52] U.S. Cl. ..................... 33/645; 33/533; 29/271; 29/468
[58] Field of Search ......................... 33/645, 520, 533, 33/600, 613, 644, 542, 543, 544.4; 29/270, 271, 464, 467, 468

[56] References Cited

U.S. PATENT DOCUMENTS

| | | |
|---|---|---|
| 1,311,128 | 7/1919 | Kilgour . |
| 1,876,021 | 9/1932 | Quigley . |
| 2,568,390 | 9/1951 | Gehrke . |
| 2,963,090 | 12/1960 | Cole et al. ........................ 33/645 |
| 2,968,872 | 1/1961 | Welles ............................. 33/645 |
| 3,685,126 | 8/1972 | Kane . |
| 5,513,547 | 5/1996 | Lovelace ......................... 29/271 |
| 5,590,474 | 1/1997 | Lamb ............................. 33/520 |

*Primary Examiner*—Christopher W. Fulton
*Attorney, Agent, or Firm*—Dunlap & Codding, P.C.

[57] ABSTRACT

A structural member alignment tool is provided for aligning and connecting misaligned structural members having bores therethrough and a method for using same. There is also provided a flange alignment tool kit comprising a structural member alignment tool and a plurality of sleeves and a method for using same. The sleeves decrease the inner diameter of the structural member bores thereby allowing the structural member alignment tool to align misaligned structural members.

18 Claims, 6 Drawing Sheets

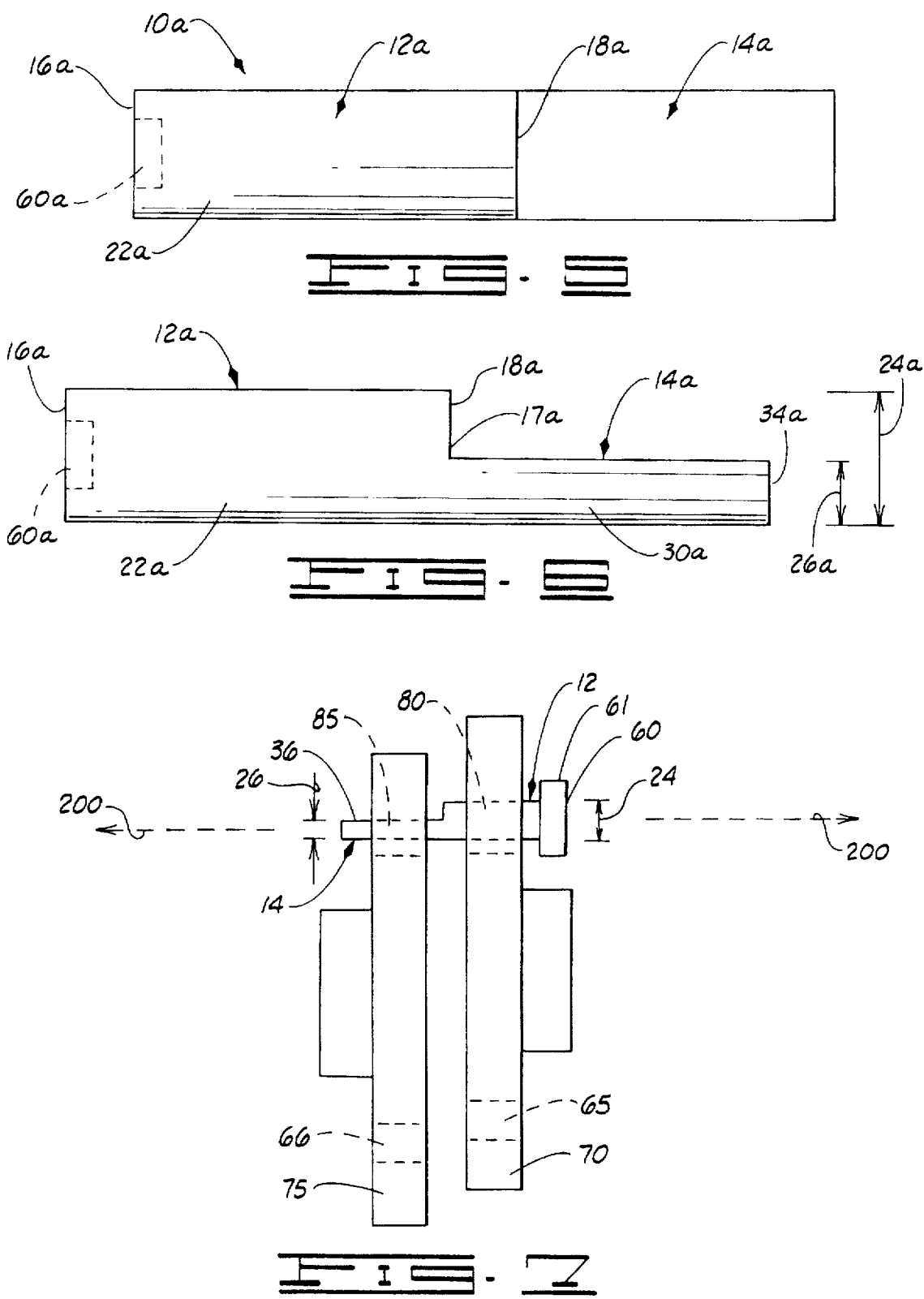

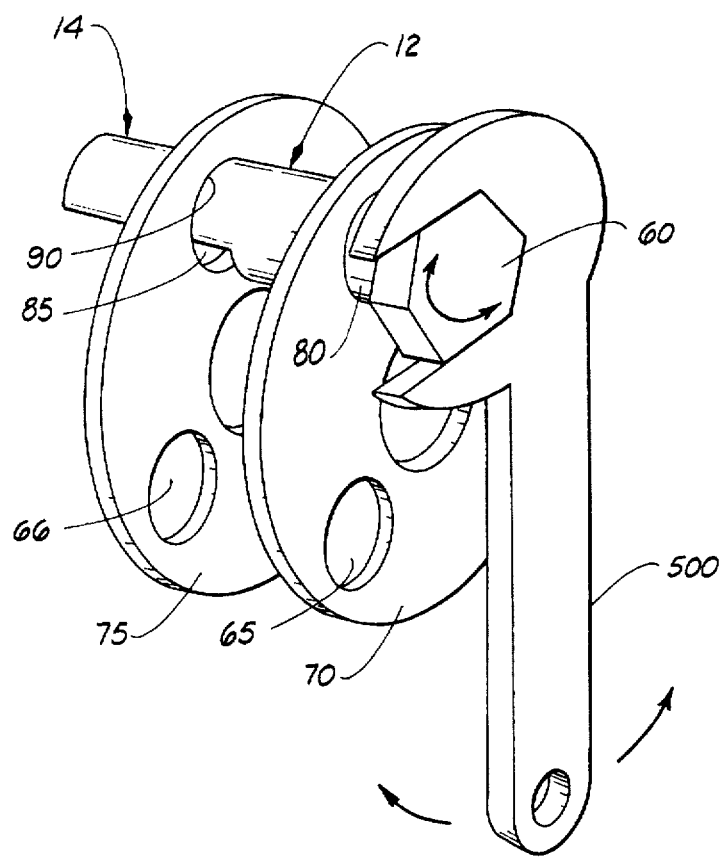
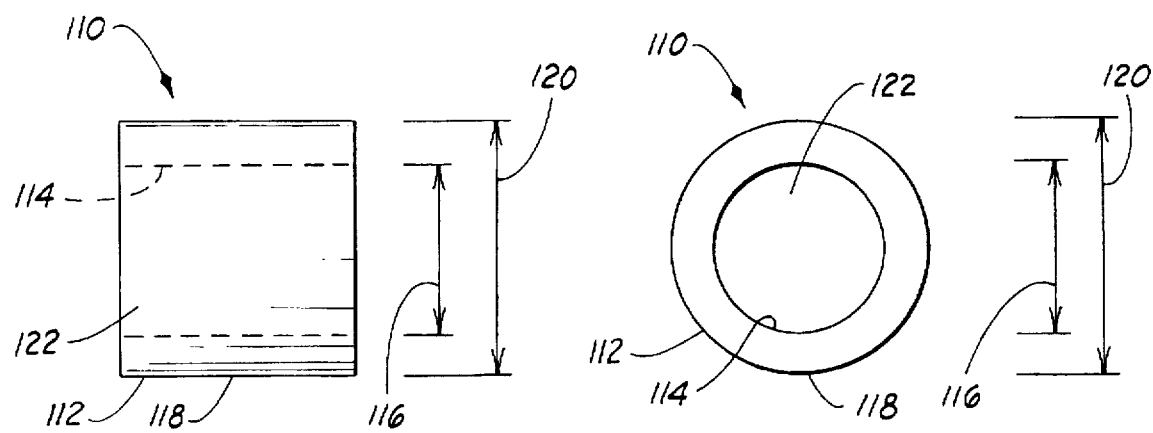

STRUCTURAL MEMBER ALIGNMENT TOOL AND METHOD OF USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a tool for aligning the bores of at least two structural members, and more particularly to a structural member alignment tool and method of using same for aligning the bores of at least two non-linearly aligned structural members so that fasteners are disposable within the bores of the structural members thereby engagingly connecting the structural members.

2. Brief Description of the Related Art

The assembly of many mechanical structures requires that a structural member be positioned in such a manner that at least one other structural member may be connected therewith. More particularly, structural members such as flanges having bores therethrough must be positioned in an aligned manner so that fasteners may be inserted into the bores in order to connect the flanges. The alignment of the structural members is often labor intensive, time consuming, and even dangerous. Additionally, proper alignment of the structural members enhances the function of the mechanical structure, which in turn, affects durability, performance, and the overall efficiency of the structure. It is customary for individuals to apply a great deal of force to structural members, such as flanges, in order to force the structural members into a position in which the fasteners can be inserted through the bores of each of the then linearly aligned structural members. The alignment of the structural members is often a difficult and painstaking process. Thus, it would be desirable if a device could be provided which would permit an individual to quickly and easily position structural members which are to be fastened to one another in a linear fashion.

It is thus an object of the present invention to provide a structural member alignment tool which permits an individual to quickly and easily position non-linearly aligned structural members which are to be fastened to one another.

It is still further an object of the present invention to provide a structural member alignment tool kit consisting of a structural member alignment tool and a plurality of sleeves in order to properly align bores of differing shapes and sizes.

These and other objects of the present invention will become apparent in light of the present Specification, Claims and Drawings.

BRIEF SUMMARY OF THE INVENTION

The present invention comprises an alignment tool for aligning a bore extending through a first structural member with a bore extending through a second structural member. The alignment tool has a first shaft having a first end, a second end, and an outer peripheral surface. The first shaft has a cylindrical configuration and is sized such that the first shaft is disposable in the bore of the first structural member so as to be substantially axially aligned with a central axis of the bore of the first structural member and rotatable therein. The alignment tool also has a second shaft having a diameter less than the first shaft and extending from the second end of the first shaft such that a peripheral portion of the second shaft is coextensive with a portion of the outer peripheral surface of the first shaft. The diameter of the second shaft is sized such that at least a portion of the second shaft is disposable in the bore of the second structural member when the first shaft is disposed in the bore of the first structural member whereby upon rotation of the first and second shafts, the coextensive peripheral portion of the second shaft is rotated into engagement with the second structural member thereby aligning the bore of the second structural member with the bore of the first structural member.

In a preferred embodiment, the alignment tool may further include an adjustment head that extends from the first end of the first shaft. The adjustment head is provided with a diameter greater than the bore of the first structural member. The alignment tool may further include a recess adapted to matingly receive a tool for imparting a rotation to the adjustment head.

Likewise, in another preferred embodiment, the second end of the first shaft is provided with a recess adapted to matingly receive a tool for imparting a rotation to the first and second shafts.

In another preferred embodiment, the second shaft has a tapered surface extending along its length, opposite the coextensive peripheral surface. The tapered surface may further be planar.

The present invention further contemplates an alignment kit for aligning a bore of a first structural member with the bore of a second structural member. The alignment kit comprises a first sleeve insertable into the bore of the first structural member in order to reduce the size of the first structural member bore, with the first sleeve further defining a shaft receiving opening. There is also included in the alignment kit a second sleeve insertable into the bore of the second structural member, thereby reducing the size of the second structural member bore. The second sleeve defines a shaft receiving opening wherein the diameter of the shaft receiving opening of the second sleeve is substantially equal that of the first sleeve shaft receiving opening of the first sleeve. The alignment tool kit further includes the alignment tool described hereinabove, with and without all the preferred embodiments described.

The present invention also contemplates a method for axially aligning a bore of a first structural member with a bore of a second structural member wherein the bore of the second structural member is axially misaligned with the bore of the first structural member. The method includes the step of providing an alignment tool which includes a first and second shaft as described hereinabove. The method also includes the step of inserting the alignment tool into the bore of both the first and second structural members so that the first shaft is rotatably disposed in the bore of the first structural member and axially aligned with the central axis of the bore of the first structural member with at least a portion of the second shaft being disposed in the bore of the second structural member. The method further includes the step of rotating the first and second shafts so as to cause the coextensive peripheral portion of the second shaft to be rotated into engagement with the second structural member thereby axially aligning the bore of the second structural member with the bore of the first structural member.

The present invention further includes a method for axially aligning a plurality of bores of a first structural member with a plurality of bores of a second structural member wherein the bores of the second structural member are axially misaligned with the bores of the first structural member. The method includes the step of providing an alignment tool, with the alignment tool being generally identical to the alignment tool previously disclosed herein. The method further includes the step of inserting the alignment tool into one of the bores of the first structural member and a corresponding bore of the second structural member so that the first shaft is rotatably disposed in the bore of the first structural member and axially aligned with the central axis of the bore of the first structural member. At least a portion of the second shaft is disposed in the corresponding bore of the second structural member. The method also includes the step of rotating the first and second shafts so as to cause the coextensive peripheral portion of the second shaft to be rotated into engagement with the second structural member thereby rotating the second structural member so as to axially align the bores of the second structural member with the bores of the first structural member.

In a preferred embodiment the method includes a step of inserting a connecting member into at least one of the aligned bores of the first and second structural members. The preferred embodiment may also include the step of removing the alignment tool from the first and second structural members. And the preferred embodiment may further include the step of inserting a connecting member into the remaining aligned bores of the first and second structural members.

The present invention further comprises a method for axially aligning a bore of a first structural member with a bore of a second structural member wherein the bore of the second structural member is axially misaligned with the bore of the first structural member. The method includes the step of inserting a first sleeve into the bore of the first structural member to reduce the size of the bore of the first structural member, with the first sleeve defining a shaft receiving opening. The method also includes the step of inserting a second sleeve into the bore of the second structural member thereby reducing the size of the bore of the second structural member, with the second sleeve defining a shaft receiving opening wherein the diameter of the shaft receiving opening of the second sleeve is substantially equal to the diameter of the shaft receiving opening of the first sleeve. The first shaft also has a cylindrical configuration and is sized such that it is disposable in the shaft receiving opening of the first sleeve so as to be substantially axially aligned with a central axis of the bore of the first structural member and rotatable therein. The alignment tool further includes a second shaft having a diameter less than the first shaft and extending from the second end of the first shaft such that a peripheral portion of the second shaft is coextensive with a portion of the outer peripheral surface of the first shaft. The diameter of the second shaft is sized such that at least a portion of the second shaft is disposable in the shaft receiving opening of the second sleeve when the first shaft is disposed in the shaft receiving opening of the first sleeve. The method also includes the step of inserting the alignment tool into the shaft receiving opening of the first sleeve and the shaft receiving opening of the second sleeve so that the first shaft is rotatably disposed in the shaft receiving opening of the first sleeve and axially aligned with the central axis of the bore of the first structural member and at least a portion of the second shaft is disposed in the shaft receiving opening of the second sleeve. Finally, the method includes the step of rotating the first and second shafts so as to cause the coextensive peripheral portion of the second shaft to be rotated into engagement with the second sleeve thereby axially aligning the bore of the second structural member with the bore of the first structural member.

BRIEF DESCRIPTION OF THE SEVERAL VIEWS OF THE DRAWINGS

FIG. 5 is a top plan view of the structural member alignment tool of FIG. 4.

FIG. 6 is a side plan view of the structural member alignment tool of FIG. 4.

FIG. 7 is a pictorial representation of the structural member alignment tool of FIG. 1 disposed within misaligned bores of two structural members in accordance with the present invention.

FIG. 8 is a pictorial representation of the structural member alignment tool of FIG. 1 illustrating the procedure for aligning structural members in accordance with the present invention.

FIG. 9 is a side plan view of a sleeve used in a structural member alignment tool kit constructed in accordance with the present invention.

FIG. 10 is an end view of the sleeve used in the structural member kit.

DETAILED DESCRIPTION OF THE INVENTION

Figure 1:
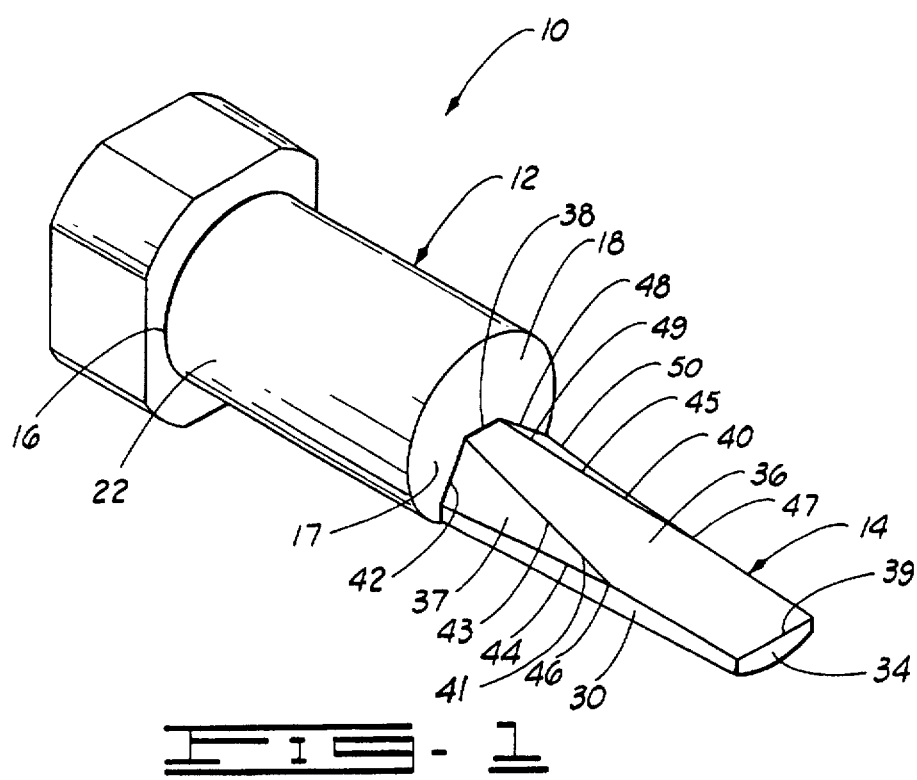
FIG. 1 is a top perspective view of a structural member alignment tool constructed in accordance with the present invention.

While this invention is susceptible of embodiment in many different forms, there are shown in the drawings and will herein be described in detail, several specific embodiments, with the understanding that the present disclosure is to be considered as an exemplification of the principles of the invention and is not intended to limit the invention to the embodiments illustrated.

Figure 3:
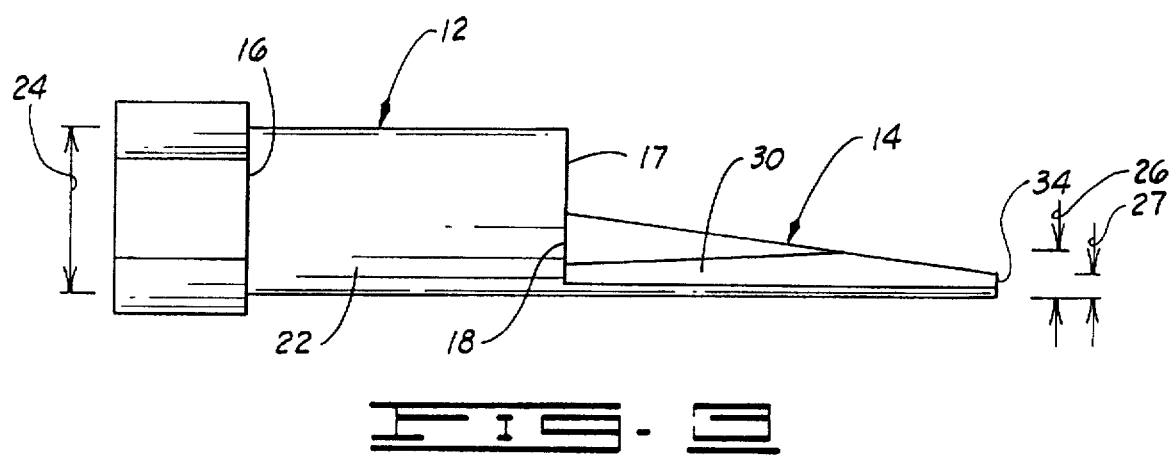
FIG. 3 is a side elevational view of the structural member alignment tool of FIG. 1.
Figure 2:
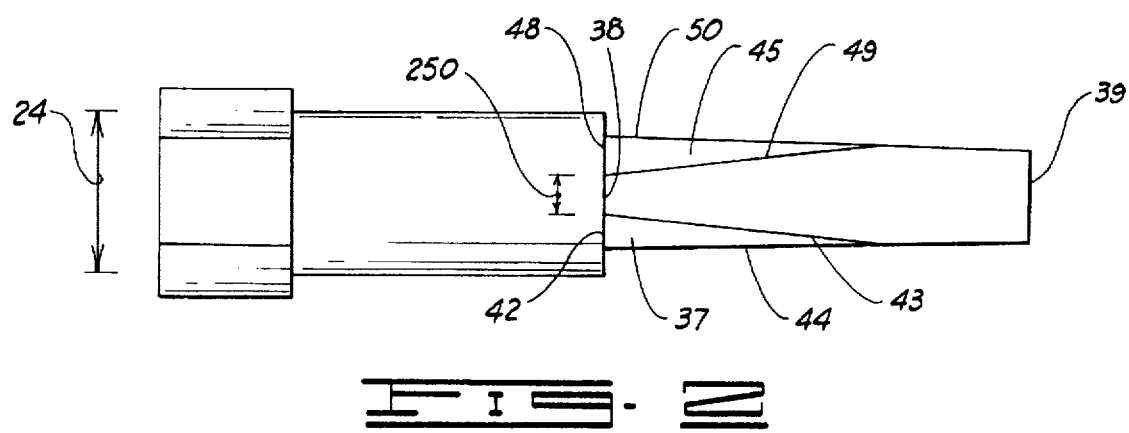
FIG. 2 is a top plan view of the structural member alignment tool of FIG. 1.

Referring now to FIGS. 1–3, one preferred embodiment of a structural member alignment tool 10, constructed in accordance with the present invention, is illustrated. The structural member alignment tool 10 includes a first shaft 12 and a second shaft 14. The first shaft 12 is characterized as a generally cylindrically shaped member having a first end 16, a second end 18, an outer peripheral surface 22, and a diameter 24. The second shaft 14 is defined as having a first end 17, a second end 34, an outer peripheral surface 30, a first end diameter 26 and a second end diameter 27.

Second shaft first end 17 abuts first shaft second end 18 such that second shaft 14 extends colinearly from first shaft first end 16. A portion of second shaft peripheral surface 30 is thereby coextensive with a portion of first shaft outer peripheral surface 22 substantially as shown.

Second shaft 14 is further defined as having a sloped engaging surface 36 with sloped engaging surface 36 having a first edge 38, a second edge 39, a first outer edge 40, a second outer edge 41, and sloped first and second side panels 37 and 45, respectively.

Sloped engaging surface first edge 38 abuts first shaft second end 18 and sloped engaging surface 36 thereby generally slopes downward from second shaft first edge 38 at a predetermined angular degree from first edge 38 to second edge 39. Second shaft first edge 38 has a width 250 (as shown in FIG. 2) less than first shaft diameter 24.

First sloped side panel 37 is generally triangularly shaped having a first edge 42, a second edge 43, and a third edge 44. First sloped side panel first edge 42 is adjacent first shaft second end 18. First sloped side panel first edge 42 slopes angularly downward beginning at sloped engaging surface first edge 38 and ending a predetermined distance at intersection point 46 adjacent at least a portion of second shaft outer peripheral surface 30. First sloped side panel second edge 43 is adjacent sloped engaging surface second outer edge 41 and intersects second shaft outer peripheral surface 30 at intersection point 46, thereby first sloped side panel second edge 43 is flared downwardly outward from sloped engaging surface first edge 38 to intersection point 46. First sloped side panel third edge 44 is positioned such that first sloped side panel third edge 44 is positioned a predetermined distance from second shaft outer peripheral surface 30.

Second sloped side panel 45 is generally triangularly shaped having a first edge 48, a second edge 49, and a third edge 50. Second sloped side panel first edge 48 is adjacent first shaft second end 18. Second sloped side panel first edge 48 slopes angularly downward beginning at sloped engaging surface first edge 38 and is positioned a predetermined distance from second shaft outer peripheral surface 30. Second sloped side panel second edge 49 is adjacent sloped engaging surface first outer edge 40 and intersects second shaft outer peripheral surface 30 at intersection point 47, thereby second sloped side panel second edge 49 is flared downwardly outward from sloped engaging surface first edge 38 to intersection point 47. Second sloped side panel third edge 50 is adjacent a portion of second shaft outer peripheral surface 30.

Second shaft height 26 (as shown in FIG. 3), in general, is smaller at first end 17 than first shaft diameter 24, and whereby second shaft height 27 is smaller at second shaft second end 34 than height 26 at second shaft first end 17. Therefore, there is described a structural member alignment tool 10 having a second shaft 14 wherein second shaft 14 is characterized by a downwardly sloped surface beginning at first end 17 and ending at second end 34.

First shaft 12 is provided with a head 60 adapted to matingly receive a tool, such as wrench 500 shown in FIG. 8, for imparting a rotation to first shaft 12 and consequently to second shaft 14. Head 60 is disposed adjacent first shaft first end 16. Head 60 is generally defined as being rectangular in shape, although it is contemplated that head 60 could be of any three-dimensional configuration, such as but not by way of limitation hexagonal, heptagonal and the like, which will matingly engage with a tool, such as wrench 500. Thereby head 60 is adapted to receive a wrench 500 whereby a torque may be applied to first shaft 12 and consequently to second shaft 14. It is to be appreciated that wrench 500 may comprise any type of wrench which could matingly engage head 60 including, but not limited to, a pneumatic wrench, a crescent wrench, an electrical wrench or any conventional hand wrench which will provide the requisite amount of torque needed, by engaging head 60 with wrench 500 and thereby maneuvering wrench 500 to apply torque to alignment tool 10.

In operation, first shaft 12 is sized such that first shaft 12 is disposable in a bore 80 of a first structural member 70 so as to be substantially rotatably positioned and axially aligned with first structural member bore 80. First shaft diameter 24 is sufficiently equal to the diameter of bore 80 extending through first structural member 70 so that first shaft 12 is rotatable with first structural member bore 80.

Second shaft 14 is provided with a generally semicylindrical configuration, as disclosed hereinabove, and is connected to the first shaft second end 18 so that a portion of outer peripheral surface 30 of second shaft 14 is coextensive with a portion of outer peripheral surface 22 of first shaft 12 substantially as shown. Second shaft 14 has a height 26 less than the first shaft diameter 24 and second shaft 14 is sized such that at least a portion of second shaft 14 is disposable in a misaligned bore 85 of a second structural member 75 when first shaft 12 is disposed in bore 80 of first structural member 70, substantially as shown in FIGS. 7 and 8. Sloped engaging surface 36 is placed adjacent an upper inner peripheral surface 90 (as shown in FIG. 8) in second structural member bore 85 such that second structural member 75 is adjacent sloped engaging surface 36.

It is further contemplated that second structural member 75 may be longitudinally or latitudinally misaligned with first structural member 70 such that bore 85 is angularly misaligned with bore 80. Bore 85 will thereby be adjacent either first or second sloped side panels 37 and 45, respectively, depending upon the direction of the misaligned first and second structural members 70 and 75. In such a manner, structural member alignment tool 10 rests substantially adjacent upper inner peripheral surface 90 of bore 85 regardless of degree of angular misalignment of second structural member bore 85 in relation to first structural member bore 80.

The distance between first shaft second end 18 and second shaft second end 34 is dependent upon the distance between first structural member 70 and second structural member 75. In any event, the length of second shaft 14 is a predetermined length that will allow first shaft 12 to be disposed within first structural member bore 80 so that second shaft 14 is disposed at least partially within second structural member bore 85 when the first and second structural members 70 and 75 are adjacently positioned to each other substantially as shown in FIGS. 7 and 8.

As will be appreciated by those of ordinary skill in the art, the length of first and second shafts 12 and 14 will vary widely provided that the length of first shaft 12 and second shaft 14 are sufficient to allow structural member alignment tool 10 to be disposed within both first structural member 70 and second structural member 75 concurrently during alignment. As an example of one such length, desirable alignment results will be obtained when first shaft 12 is provided with a length of from about three inches to about five inches and second shaft 14 is provided with a length of from about four inches to about six inches. However, any length of structural member alignment tool 10 which will align first structural member 70 and second structural member 75 concurrently is contemplated for use in the present invention.

The adjustment head 60, as shown in FIGS. 7 and 8, has an outer peripheral surface 61 extending a distance beyond the first shaft outer peripheral surface 22. The adjustment head 60 is sized greater than first structural member bore 80 thereby preventing adjustment head 60 from passing through first structural member bore 80. The adjustment head outer peripheral surface 61 is described as generally hexagonal in character, although any geometric shape capable of receiving a tool for rotation is contemplated. An example of such a rotation tool is wrench 500 (as shown in FIG. 8).

The structural member alignment tool 10 is preferably of unitary construction and fabricated of a material having sufficient strength so as to maintain the configuration and integrity of the structural member alignment tool 10 under normal conditions encountered by mechanics using such devices to align structural members. Although, it is additionally contemplated that structural member alignment tool 10 be fabricated from two or more materials or composites thereby bondingly joined together. Structural member alignment tool 10 is further constructed in a manner whereby wear resistance is imparted to the structural member alignment tool, for example through rubberization or by heat-treating the structural member alignment tool 10. Examples of material which can be employed in the fabrication of the structural member alignment tool 10 are steel and iron, although these materials are in no way meant to constitute an exhaustive list and other materials having the requisite physical characteristics described herein, are also contemplated for use.

Referring now specifically to FIGS. 7 and 8, first and second structural members 70 and 75 are provided for alignment. First structural member 70 having bore 80 therethrough and second structural member 75 having bore 85 therethrough are provided. Second structural member bore 85 is misaligned with respect to first structural member bore 80. Although it is shown in FIG. 7 that second structural member bore 85 is latitudinally misaligned as to first structural member bore 80, it is also contemplated that second structural member bore 85 be longitudinally and/or longitudinally and latitudinally misaligned with first structural member bore 80.

The structural member alignment tool 10 of FIGS. 1–3 is inserted into first and second structural members 70 and 75 so that first shaft 12 is substantially within bore 80 and second shaft 14 is substantially within bore 85 for alignment. When employing the structural member alignment tool 10 to align first structural member 70 with second structural member 75, second shaft 14 is thereby disposed through bore 80 and into bore 85, and first shaft 12 is disposed into bore 80 substantially as shown. First shaft 12, which has a diameter substantially corresponding to the diameter of bore 80, is rotatably disposed within bore 80 thereby defining an axis of alignment 200. Second shaft 14 engages a portion of inner peripheral surface of bore 85, such as an upper inner peripheral surface 90 of bore 85. Depending upon the angle of misalignment between first and second structural member bores 70 and 75, second shaft 14 will engage upper inner peripheral surface 90 of bore 85 on sloped engaging surface 36, first sloped side panel 37, or second sloped side panel 45.

Once first shaft 12 is disposed in first structural member bore 80 and second shaft 14 is disposed in second structural member bore 85, a torque is applied to adjustment head 60 via a rotational tool, such as wrench 500, disposed about adjustment head outer peripheral surface 61. The torque applied to adjustment head 60 concurrently rotates first and second shafts 12 and 14. First shaft 12 is rotated within bore 80 via the torque applied to adjustment head 60 such that first structural member 70 remains in substantially the same axial position. Second shaft 14 is rotated within second structural member bore 85 via the torque applied to adjustment head 60 such that second shaft outer peripheral surface 30 engages a portion of inner peripheral surface of second structural member bore 85, such as upper inner peripheral surface 90 of second structural member bore 85. As second shaft 14 is rotated so that second shaft outer peripheral surface 30 engages and is disposed adjacent inner peripheral surface of second structural member bore 85, second structural member 75 is moved into alignment latitudinally with first structural member 70. Of course, in the case that first and second structural members 70 and 75 are longitudinally misaligned, as second shaft 14 is rotated, second structural member 75 will be moved longitudinally into alignment with first structural member bore 80.

Once second structural member 75 is in substantial alignment with first structural member 70, a connector member 700 is disposed within first structural member open bore 65 and second structural member open bore 66 thereby connecting the aligned first and second structural members 70 and 75. If required, a reverse torque is then applied to adjustment head 60 in order to remove structural member alignment tool 10 from aligned first and second structural member bores 80 and 85.

The subsequent embodiments of the structural member alignment tool 10 operate in substantially the same manner as described hereinabove and such operation will not be repeated further. However, one of ordinary skill in the art would understand that any such modifications which perform substantially the same operation using the structural member alignment tool 10 are contemplated as constituting a part of the invention.

Figure 4:
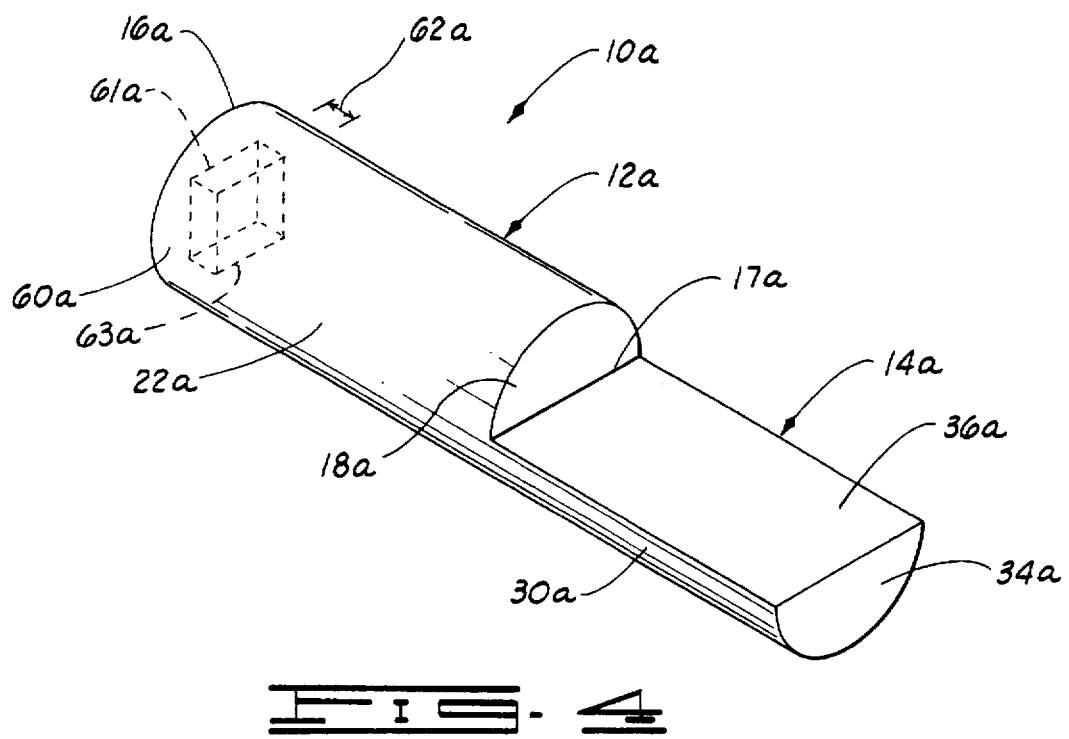
FIG. 4 is top elevational view of another embodiment of a structural member alignment tool constructed in accordance with the present invention.

Referring now to FIGS. 4–6, a structural member alignment tool 10a constructed in accordance with the present invention is shown having a first shaft 12a, a second shaft 14a, and an adjustment recess 60a. First shaft 12a is characterized as having a generally cylindrical configuration, a first end 16a, a second end 18a, an outer peripheral surface 22a, and a diameter 24a. The second shaft 14a is characterized as having a generally semi-cylindrical configuration, a diameter 26a less than first shaft diameter 24a, an outer peripheral surface 30a, a first end 17a, and a second end 34a.

Second shaft 14a extends colinearly from first shaft second end 18a such that second shaft outer peripheral surface 30a is coextensive with first shaft outer peripheral surface 22a as shown in FIG. 6. Adjustment recess 60a is characterized as being generally rectangular, having an outer rectangular peripheral edge 61a flush with first shaft first end 16a and being recessed into first shaft first end 16a a predetermined distance 62a so that an inner rectangular peripheral edge 63a is recessed into first shaft 12a a predetermined distance 62a thereby creating an adjustment recess 60a, having a volume, in first shaft 12a.

Second shaft 14a is defined generally as being semi-clindrical and having a planar engaging surface 36a which extends from second shaft first end 17a to second shaft second end 34a. It is also contemplated that planar engaging surface 36a flare inwardly, downwardly, or any combination thereof so that there is provided a planar engaging surface 36a having sloped and flared secondary engaging surfaces (not shown). Operation of a structural member alignment tool 10a is identical to structural member alignment tool 10 discussed hereinabove. However, it will be noted that in operation, a rotational tool (not shown) having the ability to matingly engage adjustment recess 60a will be provided. An example of such a rotational tool for matingly engaging adjustment recess 60a so as to provide a torque would be an allen wrench, although any rotational tool having the ability to matingly engage adjustment recess 60a is contemplated. Therefore, the operation of structural member alignment tool 10a will not be repeated here.

Referring now to FIGS. 9 and 10, a structural member alignment tool kit 110 constructed in accordance with the present invention is illustrated. Structural member alignment tool kit 110 is provided with the structural member alignment tool 10 of FIGS. 1–3 and a plurality of sleeves, one such sleeve 112 being illustrated in FIGS. 9 and 10. Sleeve 112 is provided with an inner surface 114 defining an inner diameter 116, an outer surface 118 defining an outer diameter 120, and a shaft receiving opening 122 therethrough.

Figure 11:
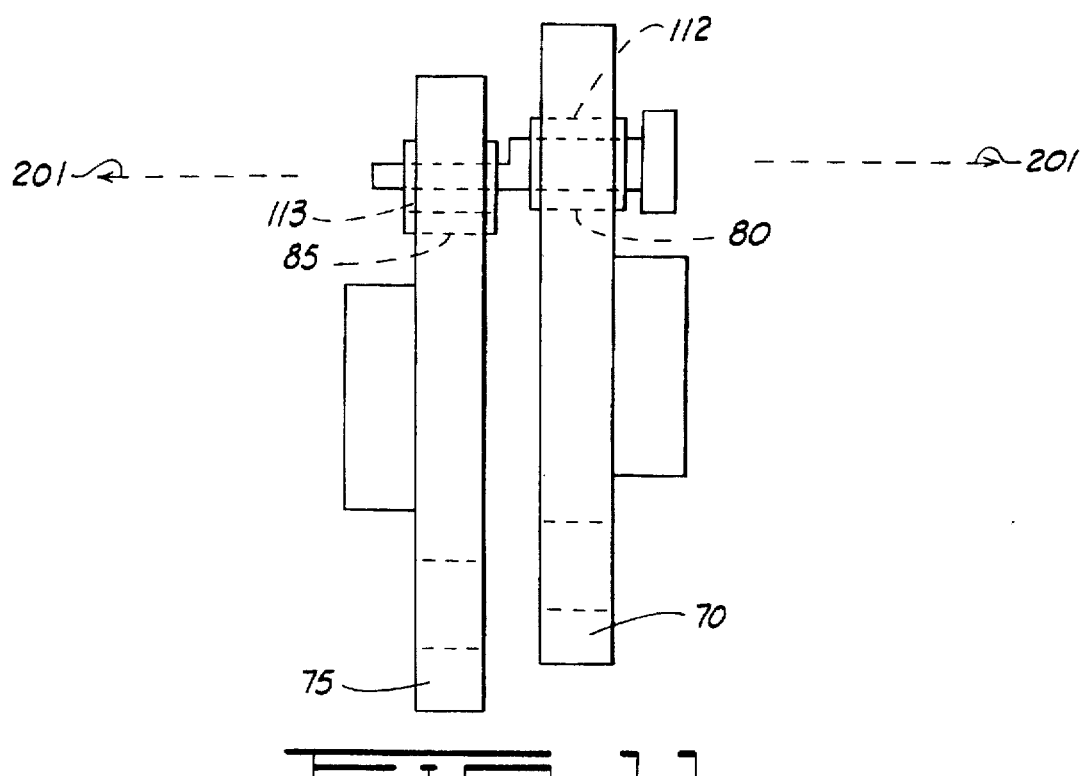
FIG. 11 is a pictorial representation of the structural member alignment tool kit disposed within the misaligned bores of two structural members.

First sleeve 112 is insertable into first structural member bore 80 as shown in FIG. 11. A second sleeve 113, having substantially the same characteristics as sleeve 112, is insertable within a portion of second structural member bore 85 substantially as shown in FIG. 11. Sleeve 112 thereby reduces the size of first structural member bore 80 and second sleeve thereby reduces the size of second structural member bore 85.

Thus, shaft receiving opening 122 of first sleeve 112 is adapted to matingly receive first shaft 12 of structural member alignment tool 10 and shaft receiving opening 123 of second sleeve 113 (FIG. 12) is adapted to receive second shaft 14 of structural member alignment tool 10, for aligning first and second structural members 70 and 75. In operation, first shaft 12 and second shaft 14 are rotated within the shaft receiving openings 122 and 123 of sleeves 112 and 113, respectively, as heretofore described in operation of alignment tool 10 with reference to FIGS. 7–8.

The length of first and second sleeves 112 and 113 can vary widely provided that the length of first and second sleeves 112 and 113 are sufficiently long so as to permit sleeves 112 and 113 to be disposed within first and second structural member bores 80 and 85 during alignment. Structural member alignment tool kit 110 is desirably fabricated of a material having sufficient strength so as to maintain the configuration and integrity of structural member alignment tool kit 110 under normal conditions encountered by mechanics using such devices to align structural members. Additionally, the material must be capable of exhibiting wear resistance when structural member alignment tool kit 110 is operated as previously described in connection with structural member alignment tool 10. Steel and iron are two materials which can be employed in the fabrication of structural member alignment tool kit 110, although these materials are not an exhaustive list of materials which can be used in the fabrication of structural member alignment tool kit 110. The size and density of the material employed in the fabrication of structural member alignment tool kit 110 can also vary widely and will generally be dependent upon the structural members being aligned.

Figure 12:
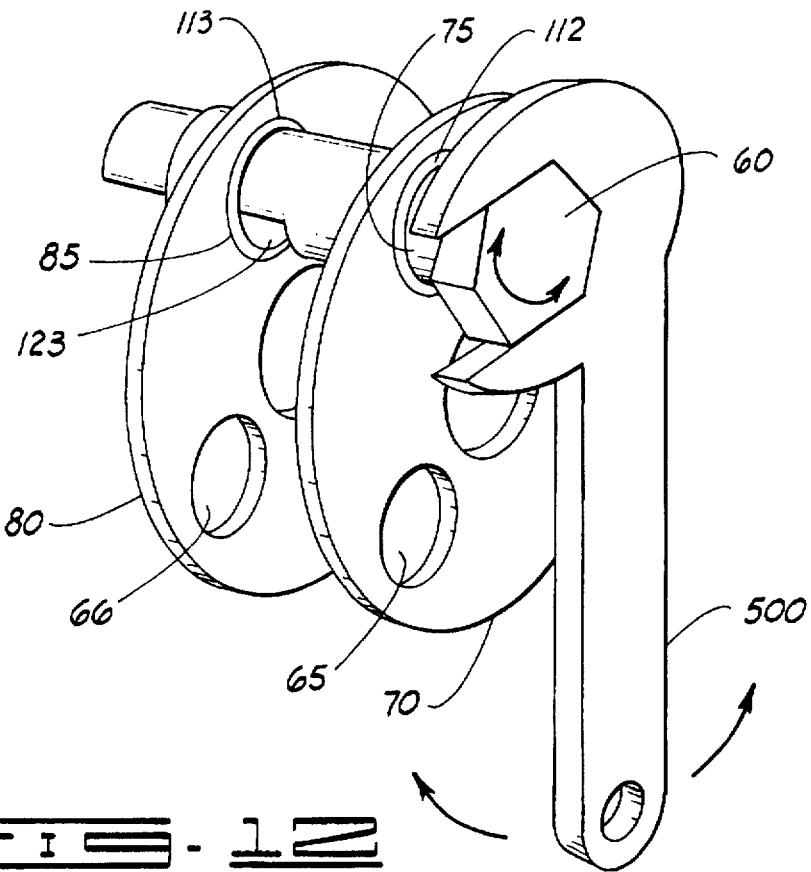
FIG. 12 is a pictorial representation of the structural member alignment tool kit illustrating the procedure for aligning structural members in accordance with the present invention.

In operation, first and second sleeves 112 and 113 are inserted into misaligned first and second structural member bores 80 and 85, as shown in FIGS. 11 and 12, thereby reducing the diameter of first and second structural member bores 80 and 85, respectively, substantially as shown.

Structural member alignment tool 10 of FIGS. 1–3 is then inserted into first and second sleeve shaft receiving openings 122 and 123 for alignment. When employing structural member alignment tool 10 to align first structural member 70 with second structural member 75, second shaft 14 is disposed through first structural member bore 80 via shaft receiving opening 122 of first sleeve 112 and into second structural member bore 85 via shaft receiving opening 123 of second sleeve 113, substantially as shown in FIG. 12. First shaft 12 is disposed within shaft receiving opening 122 of sleeve 112 disposed in first structural member bore 70 thereby defining an axis of alignment 201 for first and second structural members 70 and 75, as shown in FIG. 11.

A torque is applied to alignment tool adjustment head 60 via a wrench 500 disposed about the outer peripheral surface 61 of adjustment head 60. The torque applied to adjustment head 60 rotates first and second shafts 12 and 14 around axis of alignment 201. First shaft 12 is rotated within shaft receiving opening 122 of the sleeve 112 disposed within bore 80 of first structural member 70 via torque applied to the adjustment head 60 such that first structural member 70 remains in substantially the same longitudinal and/or latitudinal position. Second shaft 14 is rotated within shaft receiving opening 123 of sleeve 113 disposed within bore 85 of second structural member 75 via torque applied to adjustment head 60 such that second shaft outer peripheral surface 30 engages a portion of shaft receiving opening 123 of sleeve 113 disposed within bore 85 and thereby moves second structural member 75 into alignment with first structural member 70.

Once second structural member 75 is in substantial alignment with first structural member 70, a fastener is disposed within first structural member open bore 65 and into second structural member open bore 66 thereby connecting structural members 70 and 75 in an axially aligned position. A reverse torque can then be applied if necessary to adjustment head 60 to enhance the removal of structural member alignment tool 10 from structural members 70 and 75 so that first and second sleeves 112 and 113 can be removed.

Figure 13:
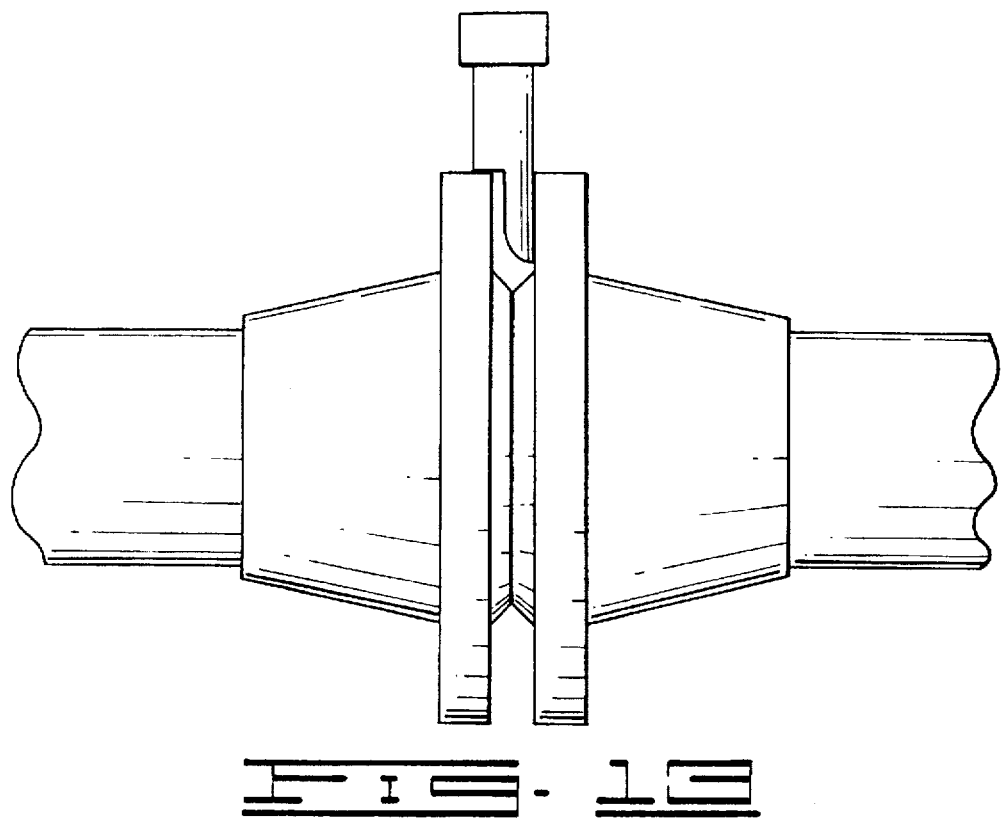
FIGS. 13 and 14 are a pictorial representation of the structural member alignment tool kit illustrating the procedure for spreading structural members apart in accordance with the present invention.

Oftentimes, two aligned structural members, such as first and second structural members 70 and 75 shown in FIG. 13, require the removal and/or replacement of a gasket therebetween. The removal and/or replacement of the gasket is, however, difficult because of the relative amount of force each structural member is oppositely exerting on the other. Therefore, a tool is needed to spread structural members 70 and 75 away from each other. The structural alignment tool 10, as described hereinabove with reference to FIGS. 1–3 is contemplated for use as a structural member spreader. As shown in FIG. 13, structural member alignment tool 10 may be inserted between first structural member 70 and second structural member 75 substantially as shown. Second shaft 14 is placed between first and second structural members 70 and 75 so that sloped engaging surface 36 is adjacent first structural member 70 (not shown) or adjacent second structural member 75 as shown in FIG. 13. Structural member alignment tool includes head 60 which can matingly engage a rotational tool, such as wrench 500 show in FIG. 8.

In operation, structural member alignment tool 10 is placed between first and second structural members 70 and 75. A wrench 500 matingly engages head 60 which is attached to first shaft 12. A rotational torque is applied to head 60 by wrench 500, thereby concurrently axially rotating first shaft 12 and second shaft 14. As second shaft 14 is axially rotated, sloped engaging surface 36 rotates and first and second structural members 70 and 75 come into contact with first and second sloped side panels 37 and 45, respectively. As first and second structural members 70 and 75 rest adjacent first and second sloped side panels 37 and 45, first and second structural members 70 and 75 become spaced apart a predetermined distance 303. With the addition of the spaced apart predetermined distance 303, insulating gasket 309 is effortlessly inserted between first and second structural members 70 and 75. After inserting the insulating gasket 309 between first and second structural members 70 and 75, a second rotational torque is applied to structural member alignment tool 10 by wrench 500 thereby placing sloped engaging surface 36 adjacent first or second structural members 70 and 75, in turn eliminating the spaced apart predetermined distance 303. Structural member alignment tool 10 is then removed from between first and second structural members 70 and 75. Of course, it would be understood by those with skill in the art having this disclosure before them, that although this operation is described as using structural alignment tool 10, structural alignment tool 10a is also contemplated for use.

The foregoing description and drawings are merely to explain and illustrate the invention and the invention is not limited thereto except insofar as the appended claims are so limited, as those skilled in the art who have the disclosure before them will be able to make modifications and variations therein without departing from the scope of the invention.

What is claimed:

1. An alignment tool for aligning a bore extending through a first structural member with a bore extending through a second structural member, the alignment tool comprising:

a first shaft having a first end, a second end, and an outer peripheral surface, the first shaft having a cylindrical configuration and sized such that the first shaft is disposable in the bore of the first structural member so as to be substantially axially aligned with a central axis of the bore of the first structural member and rotatable therein; and a second shaft having a diameter less than the first shaft and extending from the second end of the first shaft such that a peripheral portion of the second shaft is coextensive with a portion of the outer peripheral surface of the first shaft, the diameter of the second shaft sized such that at least a portion of the second shaft is disposable in the bore of the second structural member when the first shaft is disposed in the bore of the first structural member whereby upon rotation of the first and second shafts the coextensive peripheral portion of the second shaft is rotated into engagement with the second structural member thereby aligning the bore of the second structural member with the bore of the first structural member.

2. The alignment tool of claim 1 further comprising an adjustment head extending from the first end of the first shaft, the adjustment head having a diameter greater than the bore of the first structural member.

3. The alignment tool of claim 1 wherein the second end of the first shaft is provided with a recess adapted to matingly receive a tool for imparting a rotation to the first and second shafts.

4. The alignment tool of claim 2 wherein the adjustment head is provided with a recess adapted to matingly receive a tool for imparting a rotation to the adjustment head.

5. The alignment tool of claim 1 wherein the second shaft has a tapered surface extending along the length thereof opposite the coextensive peripheral surface of the second shaft.

6. The alignment tool of claim 5 wherein the tapered surface of the second shaft is planar.

7. An alignment kit for aligning a bore of a first structural member with the bore of a second structural member, the alignment kit comprising:

a first sleeve insertable into the bore of the first structural member to reduce the size of the bore of the first structural member, the first sleeve defining a shaft receiving opening;

a second sleeve snugly insertable into the bore of the second structural member to reduce the size of the bore of the second structural member, the second sleeve defining a shaft receiving opening wherein the diameter of the shaft receiving opening of the second sleeve is substantially equal to the diameter of the shaft receiving opening of the first sleeve; and an alignment tool, comprising:

a first shaft having a first end, a second end, and an outer peripheral surface, the first shaft having a cylindrical configuration and sized such that the first shaft is disposable in the shaft receiving opening of the first sleeve when the first sleeve is inserted into the bore of the first structural member such that the first shaft is substantially axially aligned with a central axis of the bolt hole of the first structural member and rotatable therein; and a second shaft having a diameter less than the first shaft and extending from the second end of the first shaft such that a peripheral portion of the second shaft is coextensive with a portion of the outer peripheral surface of the first shaft, the diameter of the second shaft sized such that at least a portion of the second shaft is disposable in the shaft receiving opening of the second sleeve when the second sleeve is inserted into the bore of the second structural member whereby upon rotation of the first and second shafts the coextensive peripheral portion of the second shaft is rotated into engagement with the second sleeve thereby aligning the bore of the first structural member with the bore of the second structural member.

8. The alignment tool of claim 7 further comprising:

an adjustment head extending from the first end of the first shaft, the adjustment head having a diameter greater than the bore of the first structural member.

9. The alignment tool of claim 7 wherein the first end of the first shaft is provided with a recess adapted to matingly receive a tool for imparting a rotation to the first and second shafts.

10. The alignment tool of claim 8 wherein the adjustment head is provided with a recess adapted to matingly receive a tool for imparting a rotation to the adjustment head.

11. The alignment tool of claim 7 wherein the second shaft has a tapered surface extending along the length thereof opposite the coextensive peripheral surface of the second shaft.

12. The alignment tool of claim 11 wherein the tapered surface of the second shaft is planar.

13. A method for axially aligning a bore of a first structural member with a bore of a second structural member wherein the bore of the second structural member is axially misaligned with the bore of the first structural member, the method comprising the steps of:

providing an alignment tool comprising:

a first shaft having a first end, a second end, and an outer peripheral surface, the first shaft having a cylindrical configuration and sized such that the first shaft is disposable in the bore of the first structural member so as to be substantially axially aligned with a central axis of the bore of the first structural member and rotatable therein; and a second shaft having a diameter less than the first shaft and extending from the second end of the first shaft such that a peripheral portion of the second shaft is coextensive with a portion of the outer peripheral surface of the first shaft, the diameter of the second shaft sized such that at least a portion of the second shaft is disposable in the bore of the second structural member when the first shaft is disposed in the bore of the first structural member;

inserting the alignment tool into the bore of the first structural member and the bore of the second structural member so that the first shaft is rotatably disposed in the bore of the first structural member and axially aligned with the central axis of the bore of the first structural member and at least a portion of the second shaft is disposed in the bore of the second structural member; and rotating the first and second shafts so as to cause the coextensive peripheral portion of the second shaft to be rotated into engagement with the second structural member thereby axially aligning the bore of the second structural member with the bore of the first structural member.

14. A method for axially aligning a plurality of bores of a first structural member with a plurality of bores of a second structural member wherein the bores of the second structural member are axially misaligned with the bores of the first structural member, the method comprising the steps of:

providing an alignment tool comprising:
a first shaft having a first end, a second end, and an outer peripheral surface, the first shaft having a cylindrical configuration and sized such that the first shaft is disposable in the bore of the first structural member so as to be substantially axially aligned with a central axis of the bore of the first structural member and rotatable therein; and a second shaft having a diameter less than the first shaft and extending from the second end of the first shaft such that a peripheral portion of the second shaft is coextensive with a portion of the outer peripheral surface of the first shaft, the diameter of the second shaft sized such that at least a portion of the second shaft is disposable in the bore of the second structural member when the first shaft is disposed in the bore of the first structural member;

inserting the alignment tool into one of the bores of the first structural member and a corresponding bore of the second structural member so that the first shaft is rotatably disposed in the bore of the first structural member and axially aligned with the central axis of the bore of the first structural member and at least a portion of the second shaft is disposed in the corresponding bore of the second structural member; and rotating the first and second shafts so as to cause the coextensive peripheral portion of the second shaft to be rotated into engagement with the second structural member thereby rotating the second structural member so as to axially align the bores of the second structural member with the bores of the first structural member.

15. The method of claim 14 further comprising the step of:

inserting a connecting member into at least one of the aligned bores of the first and second structural members.

16. The method of claim 15 further comprising the step of:

removing the alignment tool from the first and second structural members.

17. The method of claim 16 further comprising the step of:

inserting a connecting member into the remaining aligned bores of the first and second structural members.

18. A method for axially aligning a bore of a first structural member with a bore of a second structural member wherein the bore of the second structural member is axially misaligned with the bore of the first structural member, the method comprising the steps of:

inserting a first sleeve into the bore of the first structural member to reduce the size of the bore of the first structural member, the first sleeve defining a shaft receiving opening;

inserting a second sleeve into the bore of the second structural member to reduce the size of the bore of the second structural member, the second sleeve defining a shaft receiving opening wherein the diameter of the shaft receiving opening of the second sleeve is substantially equal to the diameter of the shaft receiving opening of the first sleeve;

providing an alignment tool comprising:
a first shaft having a first end, a second end, and an outer peripheral surface, the first shaft having a cylindrical configuration and sized such that the first shaft is disposable in the shaft receiving opening of the first sleeve so as to be substantially axially aligned with a central axis of the bore of the first structural member and rotatable therein; and a second shaft having a diameter less than the first shaft and extending from the second end of the first shaft such that a peripheral portion of the second shaft is coextensive with a portion of the outer peripheral surface of the first shaft, the diameter of the second shaft sized such that at least a portion of the second shaft is disposable in the shaft receiving opening of the second sleeve when the first shaft is disposed in the shaft receiving opening of the first sleeve;

inserting the alignment tool into the shaft receiving opening of the first sleeve and the shaft receiving opening of the second sleeve so that the first shaft is rotatably disposed in the shaft receiving opening of the first sleeve and axially aligned with the central axis of the bore of the first structural member and at least a portion of the second shaft is disposed in the shaft receiving opening of the second sleeve; and rotating the first and second shafts so as to cause the coextensive peripheral portion of the second shaft to be rotated into engagement with the second sleeve thereby axially aligning the bore of the second structural member with the bore of the first structural member.

* * * * *

UNITED STATES PATENT AND TRADEMARK OFFICE
CERTIFICATE OF CORRECTION

PATENT NO. : 5,799,408
DATED : September 1, 1998
INVENTOR(S) : Michael C. Sprayberry It is certified that error appears in the above-identified patent and that said Letters Patent is hereby corrected as shown below:

Drawings,
Fig. 1, please insert the numeral -- 60 -- and its associated lead line.

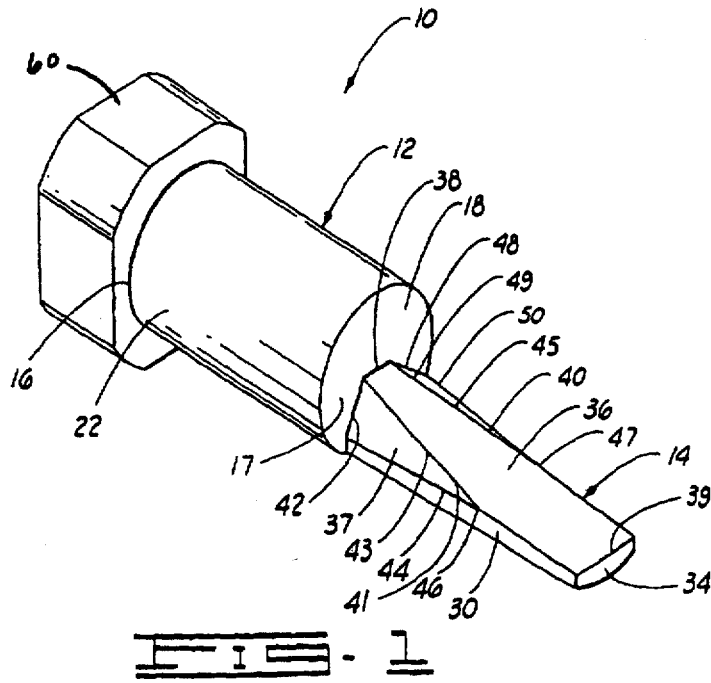

Fig. 2, please insert the numerals
-- 10 --, -- 12 --, -- 14 --, -- 16 --, -- 17 --,
-- 18 --, -- 30 --, -- 34 --, -- 36 --,
-- 40 --, -- 41 --, and -- 60 -- and each associated lead line.

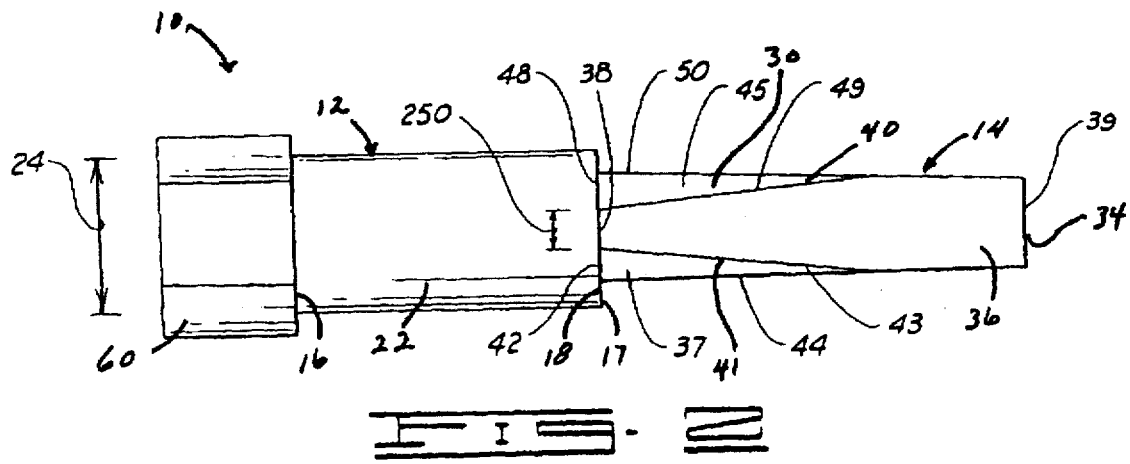

UNITED STATES PATENT AND TRADEMARK OFFICE
CERTIFICATE OF CORRECTION

PATENT NO. : 5,799,408
DATED : September 1, 1998
INVENTOR(S) : Michael C. Sprayberry It is certified that error appears in the above-identified patent and that said Letters Patent is hereby corrected as shown below:

Fig. 3, please insert the numerals -- 10 --, -- 37 -- and -- 60 -- and each associated lead line.

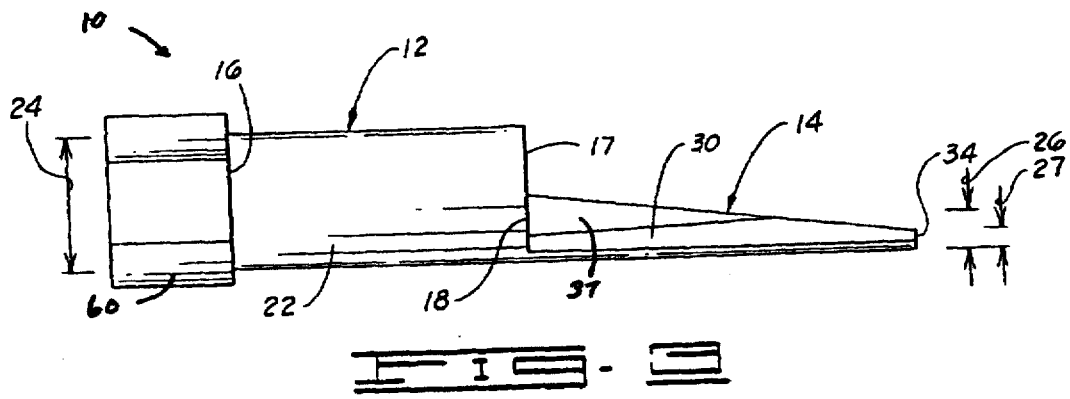

Fig. 4, please delete the solid lead line associated with -- 60a -- and substitute therefor a dashed line.

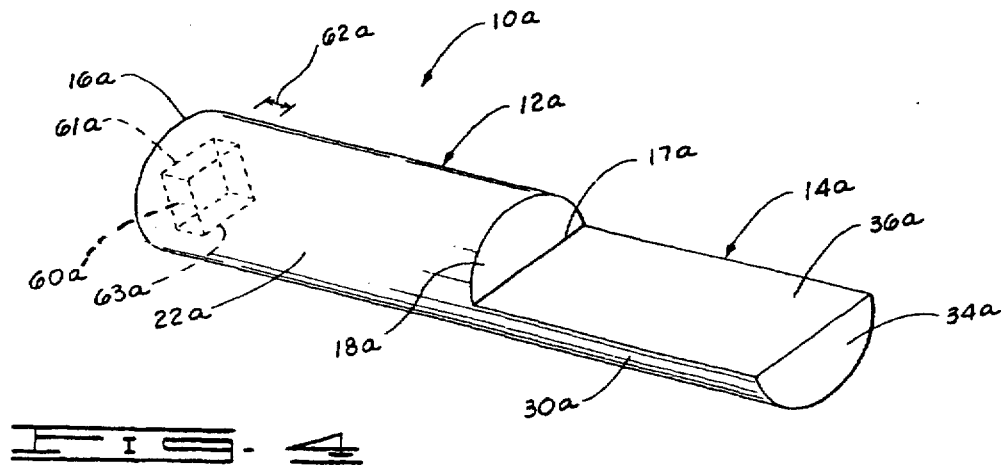

UNITED STATES PATENT AND TRADEMARK OFFICE
CERTIFICATE OF CORRECTION

PATENT NO.   : 5,799,408
DATED        : September 1, 1998
INVENTOR(S)  : Michael C. Sprayberry It is certified that error appears in the above-identified patent and that said Letters Patent is hereby corrected as shown below:

Fig. 5, please insert the numerals -- 17a --, -- 34a -- and -- 36a -- and each associated lead line.

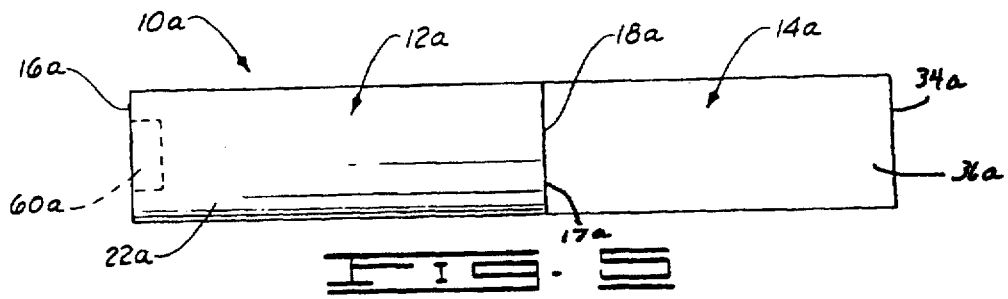

Fig. 6, please insert the numberal -- 10a -- and its associated lead line.

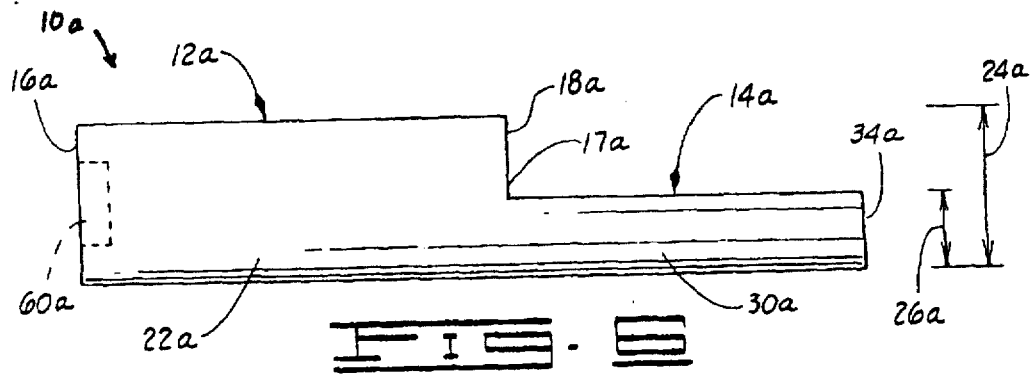

UNITED STATES PATENT AND TRADEMARK OFFICE
CERTIFICATE OF CORRECTION

PATENT NO.    : 5,799,408
DATED         : September 1, 1998
INVENTOR(S)   : Michael C. Sprayberry It is certified that error appears in the above-identified patent and that said Letters Patent is hereby corrected as shown below:

Fig. 8, please insert the numeral -- 61 -- and its associated lead line.

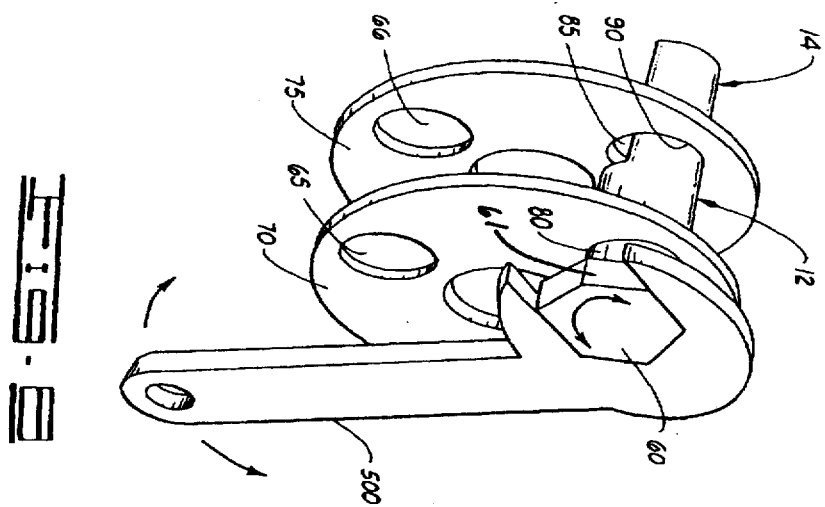

Fig. 12, please insert the numrals -- 12 --, -- 14 -- and -- 61 -- and each associated lead line; please delete the numeral "75" and substitute therefor -- 80 --; please delete the numeral "80" and substitute therefor -- 75 --.

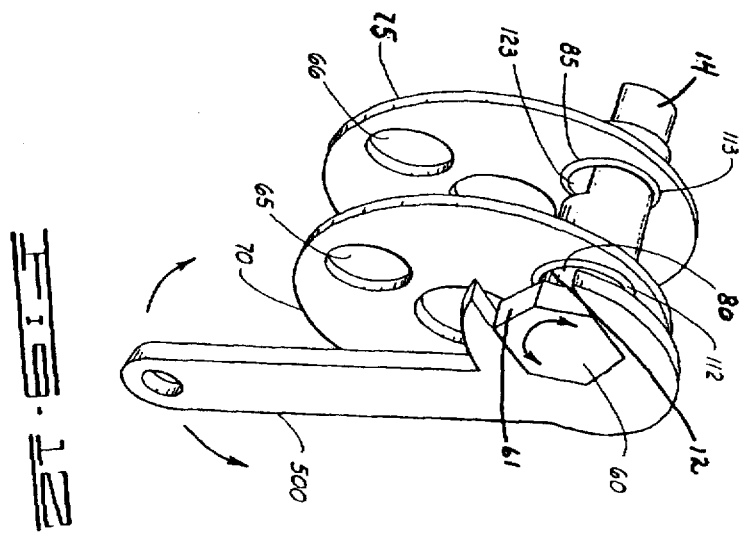

UNITED STATES PATENT AND TRADEMARK OFFICE
CERTIFICATE OF CORRECTION

PATENT NO. : 5,799,408
DATED : September 1, 1998
INVENTOR(S) : Michael C. Sprayberry It is certified that error appears in the above-identified patent and that said Letters Patent is hereby corrected as shown below:

Fig. 13, please add the numerals -- 10 --,
-- 12 --, -- 14 --, -- 60 --, -- 70 -- and -- 75 --
and each associated lead line.

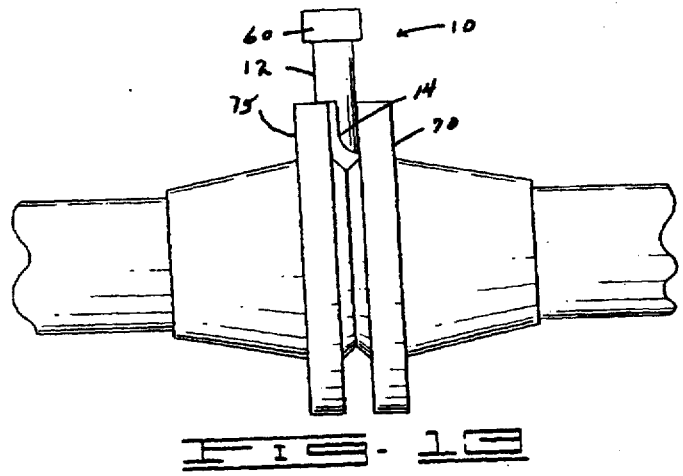

Figure 14:
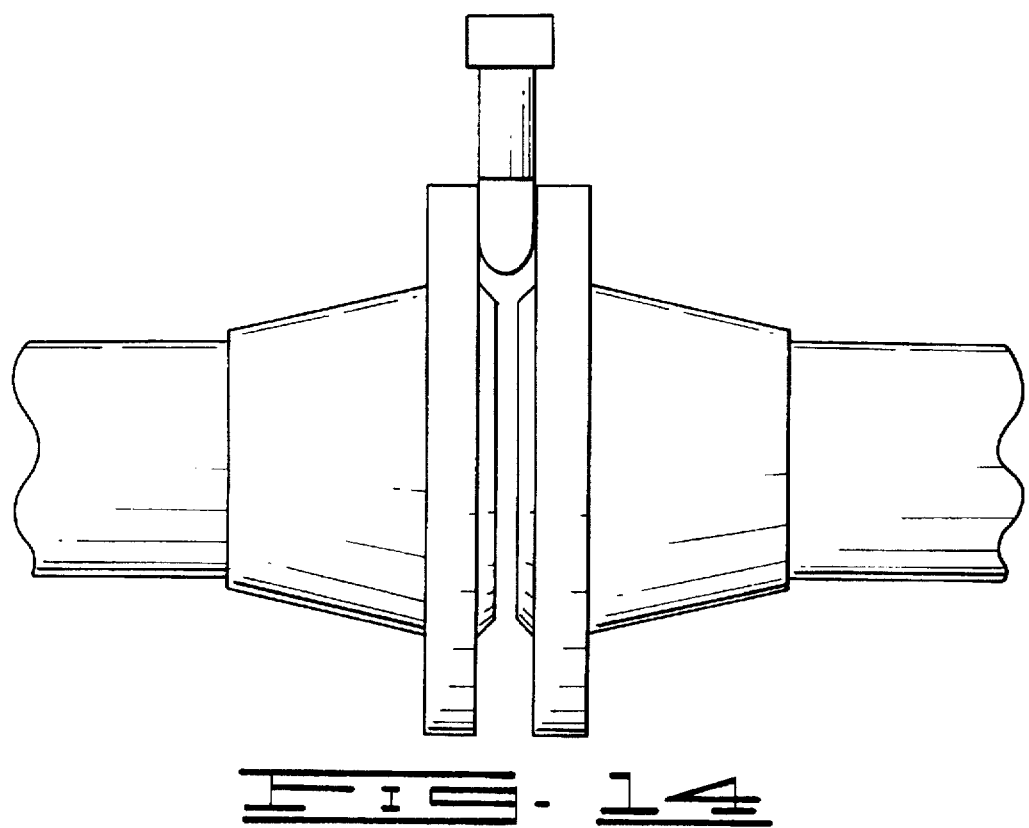

Fig. 14, please add the numerals -- 10 --,
-- 60 --, -- 70 -- and -- 75 -- and each
Associated lead line.

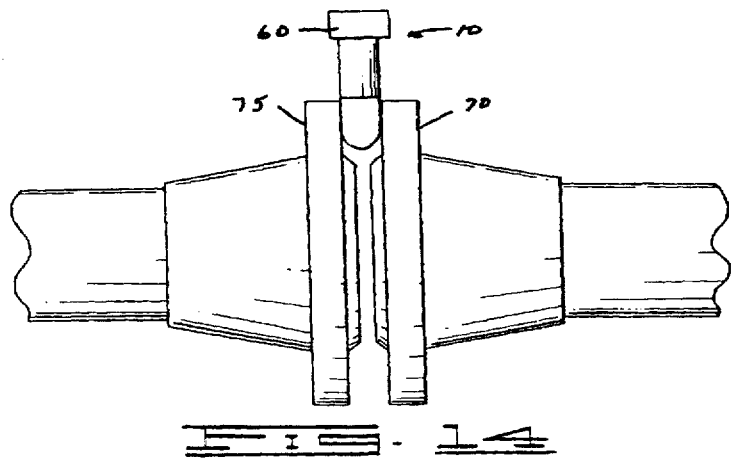

UNITED STATES PATENT AND TRADEMARK OFFICE
CERTIFICATE OF CORRECTION

PATENT NO. : 5,799,408
DATED : September 1, 1998
INVENTOR(S) : Michael C. Sprayberry It is certified that error appears in the above-identified patent and that said Letters Patent is hereby corrected as shown below:

Column 5,
Line 27, delete "46" thereby" and substitute -- 46 --. Thereby -- therefor;
Line 44, delete "thereby" and substitute -- Thereby -- therefor;
Line 51, delete "whereby";

Column 6,
Line 16, delete "with" and substitute -- within -- therefor;

Column 7,
Line 18, between "10" and "be" insert -- can --;
Line 51, after "diameter" and before "substantially" insert -- 24 --;

Column 8,
Line 19, delete "700" and substitute -- (not shown) -- therefor;

Column 10,
Line 27, after "fastener" and before "is" insert -- not shown -- ;
Line 66, delete "distance 303," and substitute therefor -- distance. --;
Line 67, delete "distance 303." and substitute therefor -- distance, --;

UNITED STATES PATENT AND TRADEMARK OFFICE
CERTIFICATE OF CORRECTION

PATENT NO. : 5,799,408
DATED : September 1, 1998
INVENTOR(S) : Michael C. Sprayberry It is certified that error appears in the above-identified patent and that said Letters Patent is hereby corrected as shown below:

<u>Column 11,</u>
Line 1, delete "309" (see application, p. 24, line 9);
Line 3, delete "309" (see application, p. 24, line 11);
Line 8, delete "distance 303." and substitute -- distance. -- therefor (see application, p. 24, line 16); and
Line 50, delete "second" and substitute therefor -- first -- (see application, p.19, lines 1-7).

Signed and Sealed this

Fifth Day of February, 2002

*Attest:*

JAMES E. ROGAN
*Attesting Officer*   *Director of the United States Patent and Trademark Office*